Figure 6:
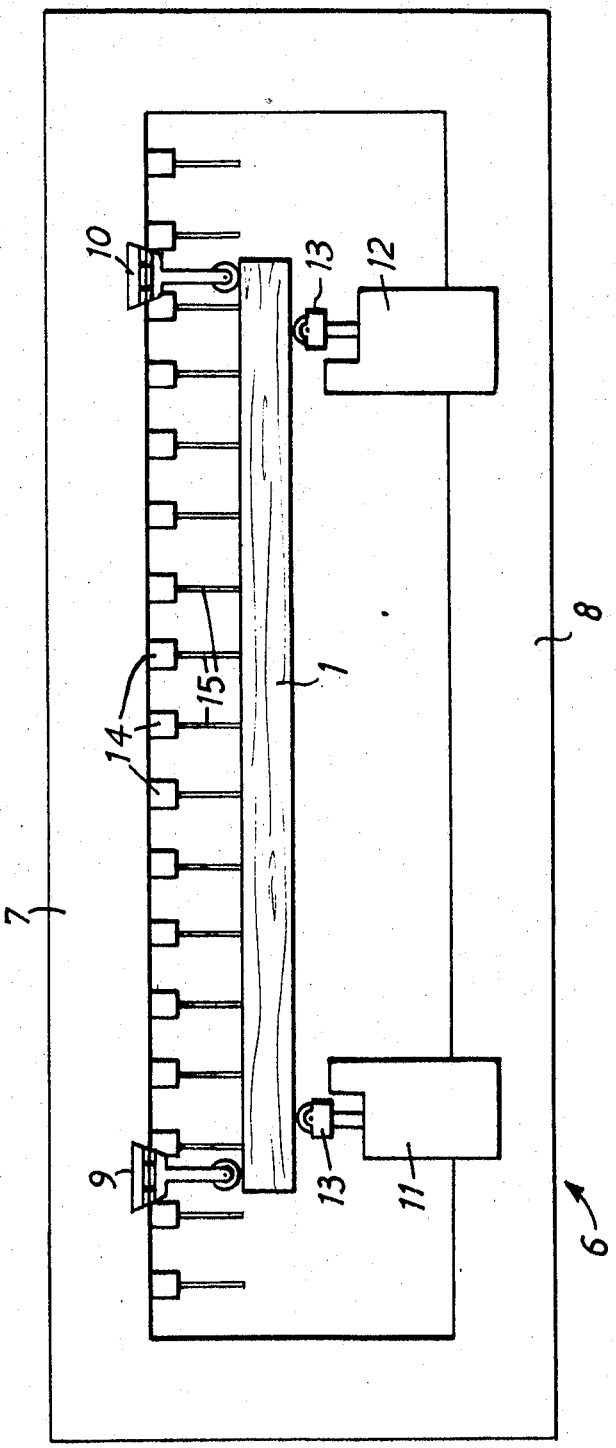

United States Patent [19]
Serry

[11] 3,760,636
[45] Sept. 25, 1973

[54] TESTING AND GRADING OF TIMBER
[75] Inventor: Victor Serry, London, S.E. 3, England
[73] Assignee: Measuring & Process Control Limited, Essex, England
[22] Filed: Nov. 29, 1971
[21] Appl. No.: 202,895

[30] Foreign Application Priority Data
Nov. 27, 1970 Great Britain.................. 56,534/70

[52] U.S. Cl. ............................................... 73/100
[51] Int. Cl. ............................................ G01n 3/20
[58] Field of Search ..................................... 73/100

[56] References Cited
UNITED STATES PATENTS
3,286,516  11/1966  Post..................................... 73/100
2,742,782  4/1956  Mironoff.............................. 73/100

Primary Examiner—Jerry W. Myracle
Attorney—E. F. Wenderoth et al.

[57] ABSTRACT

A method of testing timber in which a length of timber is bent by applying equal bending couples at two spaced points. The magnitude or directions of each couple is then changed and the change in curvature so produced all along the length between the two points is measured.

7 Claims, 7 Drawing Figures

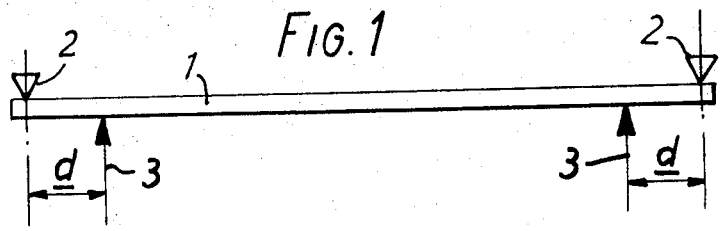
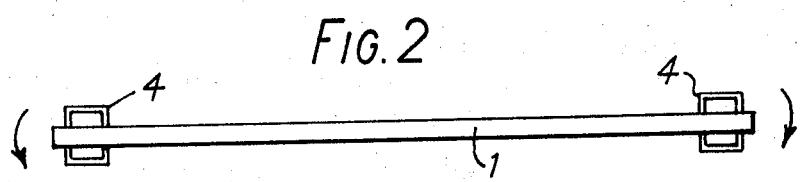
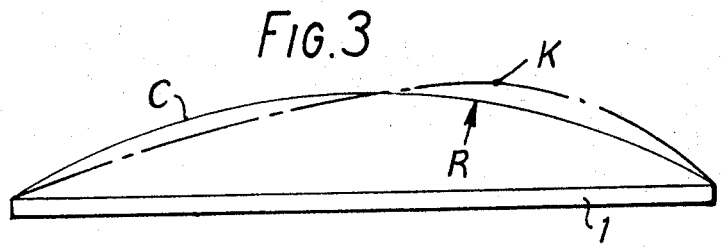
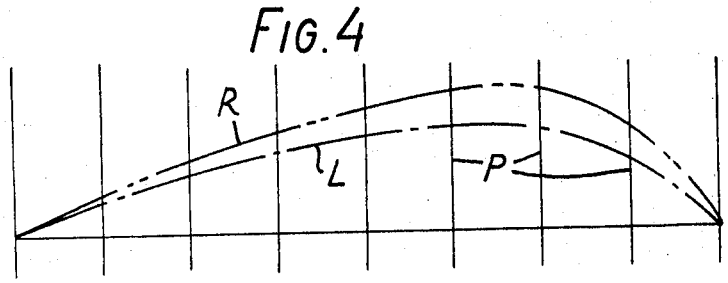
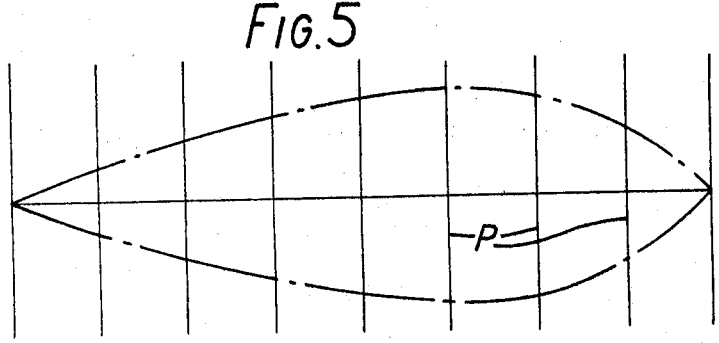

TESTING AND GRADING OF TIMBER

This invention relates to the testing and grading of timber. Non-destructive methods of testing timber are known in which the modulus of elasticity is measured by subjecting a piece of timber to a load and measuring the deflection produced by the load. In practice since timber is not of regular shape it is necessary in order to measure modulus of elasticity accurately, either to apply two different loads in succession and subtract the resulting deflections, or to apply two equal loads in succession but in opposite directions and add the resulting reflections, the difference or sum of the deflections, as the case may be, being used in the evaluation of modulus of elasticity. If such a test is carried out on a long span supported at its ends and with the load applied at its centre the answer obtained is not conclusive since a similar value of modulus could be obtained in the case of a uniform piece of timber and a piece which is generally stiffer but with a localised weakness. Moreover with such a method of loading the stress varies along the span so that only the centre of the span is fully tested.

It has thus been found necessary to test a length of timber at many points along its length. The shorter the span tested the more accurate is the measurement of modulus of elasticity at that part, but there is a resulting loss of accuracy in information concerning modulus of the piece as a whole. Also, for a pracitcal machine the spans tested must overlap by some distance because the weak place which is being sought may be under less than the full stress since it may not coincide with the point of maximum stress. Nevertheless, this process has become accepted as a method of grading timber.

There are however many disadvantages. For example, the smaller the span tested the smaller the deflection produced by the load which can safely be applied. This leads on the one hand to adverse "signal/noise× ratios in the measuring equipment and on the other hand to testing by deflecting the timber in the direction of its smaller cross-sectional dimension whereas it will probably be used in conditions where deflection occurs in the direction of its larger cross-sectional dimension. A further disadvantage is the time taken in making tests if a piece of timber has to be advanced say foot by foot through the testing machine. To overcome this it is known to carry out deflection tests as the timber is passed endwise continually through the machine. Such an arrangement greatly increases the "signal/noise" ratio problem owing to the vibration produced when the piece of timber is rapidly loaded on entry into the machine. The dynamic reactions tend to confuse the data and this results in lower correlations between the moduli of elasticity as measured by the machine and the true values and also between the modulus of elasticity as measured by the machine at the worst place and the modulus of rupture at that place.

It is an object of the present invention to provide a method of testing which enables all the required information to be obtained by the carrying out of a single test or a small number of successive tests carried out under static conditions.

A further object of the invention is to provide a method of testing which enables a much greater throughput than is possible with existing methods.

According to the invention the improved method consists in bending a length of timber by applying equal bending couples at two points spaced along the length, changing the magnitude or direction of the couples, and measuring the change in curvature so produced between the said two points.

The length of timber may be supported at each point on a fixed abutment and the load applied to the timber adjacent this point. Alternatively the length of timber may be supported at each point in a pivoted jaw which may be rotated through predetermined angles so as to apply the desired loads.

Figure 7:
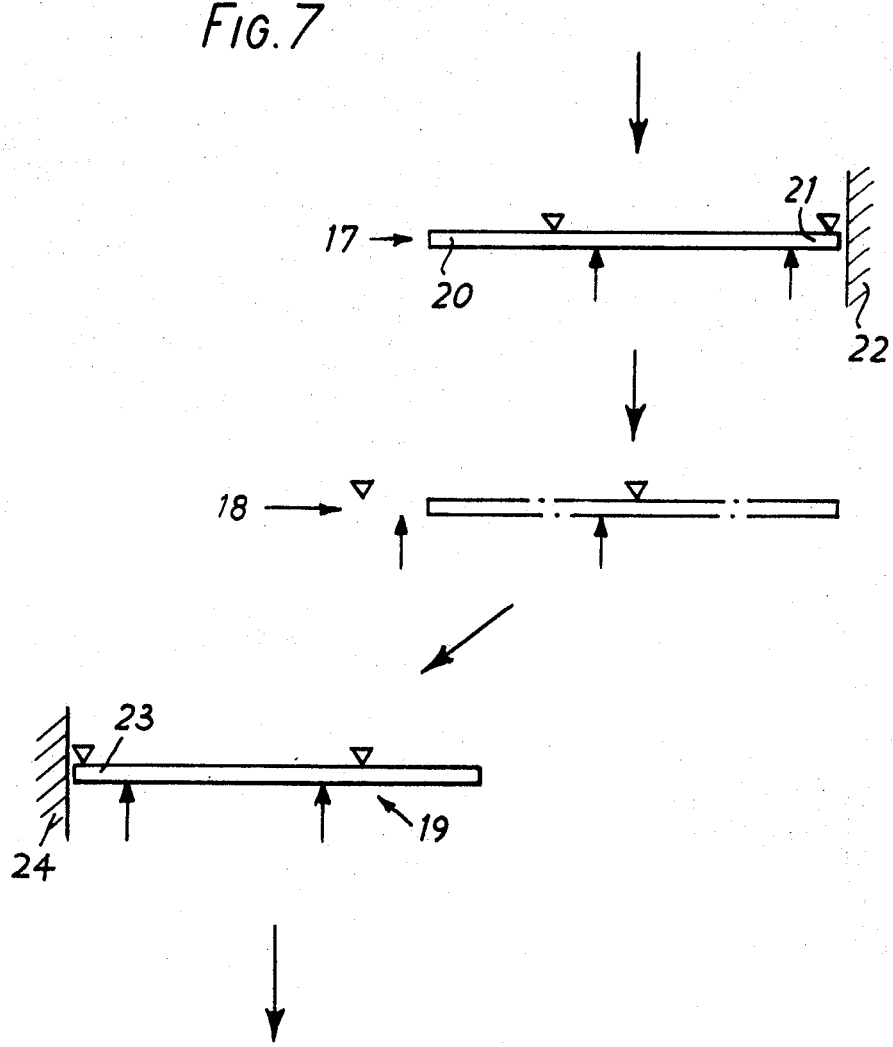

The method of the invention will now be described by way of example with reference to the diagrammatic figures of the accompanying drawings in which:

FIGS. 1 and 2 illustrate different ways of applying bending couples to a length of timber, FIG. 3 illustrates the effect of bending a uniform and a non-uniform length of timber, FIGS. 4 and 5 are explanatory diagrams, FIG. 6 illustrates one form of a machine for carrying out the method of the invention, and, FIG. 7 illustrates a method of carrying out tests on different parts of a length of timber in succession.

Referring to FIG. 1 there is shown a length of timber which is supported on spaced abutments 2 while the loads are applied at the points 3, these points being spaced at equal distances $d$ from the associated abutment, the distance $d$ being small relative to the distance between the abutments.

In the arrangement shown in FIG. 2 a length of timber 1 is shown as supported in two jaws 4 and 5. These jaws grip the timber and are pivotally mounted so that they can be rotated. In use, each jaw is rotated through a small angle so as to apply equal bending couples to the timber.

Regardless of how the piece of timber is bent it will be appreciated that it will be subjected to a stress which is substantially uniform for that part of its length which lies between the points about which the timber is bent. This will result, in the case of uniform timber, as indicated in FIG. 3, in a curvature C which is substantially arcuate and of a Radius R, which is proportional to the modulus of elasticity. If the timber if non-uniform the curvature will exhibit a kink at a point K of local weakness. Thus by measuring the curvature of the piece of timber when submitted to a bending couple it is possible to grade it both as regards overall and as regards local modulus of elasticity. Since the stress is constant the effect of a weak region (region of low modulus of elasticity) upon the curvature will be the same wherever this point occurs between the load points.

As mentioned above it is necessary in practice to measure modulus of elasticity of timber by deflecting it in two successive operations either by different loads or by equal loads in opposite directions. This procedure is also used in the method of the present invention. FIGS. 4 and 5 illustrate the procedure for a piece of timber having a weak region. FIG. 4 shows the case where the bending couples are changed in magnitude, curve L being the deflection produced by the lower couple and curve R being the deflection produced by the higher couple. FIG. 5 illustrates the corresponding case where the direction of the couple is changed. In both cases the measurement is effected by observation of the distance between the two curves as measured at a plurality of points P.

The improved method of testing has many advantages over existing methods. Since the whole span may be deflected and the stress is uniform and at maximum level all along the piece instead of only at the centre the "signal/noise" ratio problem is much reduced since greater changes in deflection are possible within acceptable stress limits. For this reason heavier sections can be tested and they can also be tested in the way in which they will be used, i.e., under deflection in the direction of the greater cross-sectional dimension. The test is carried out under static conditions and the dynamic problems occasioned by testing at high speed are thus entirely avoided. Furthermore, the new method is particularly applicable where timber is moved laterally in order to achieve a high throughput without too great a speed of movement. It will be appreciated that if the timber is moved laterally into and out of its test position such movement can be effected quite quickly as can the actual test deflections. Consequently it is possible to test and grade a very much greater total length of timber in a unit time than is possible with the prior art methods in which the timber is fed endwise through a testing machine.

FIG. 6 shows diagrammatically in plan one form of machine for carrying out the method of this invention. The machine shown comprises a rigid frame 6 providing two spaced parallel sides 7 and 8. The side 7 provides a track on which are movable two abutments 9 and 10 while the side 8 provides a track on which are movable two load applying means 11 and 12. Both the abutment and the load applying means may be movable by power operated means and preferably they should position themselves automatically according to the length of timber to be tested. Each load applying means includes a power driven ram 13 which intially operates to press the timber up against the abutments 9 and 10 and then applies the desired bending loads namely on initial load and a final load.

The side 7 of the machine has arranged along its length a plurality of deflection sensors 14 each of which has a feeler 15 that engages the side of the timber when it is pressed against the abutments. The sensors may be arranged at intervals of say 200 mm., and may be of the kind known as linear transducers which produce impulses or binary numbers in proportion to the extent of movement of the feeler. When a bending load is changed the signals from each sensor represent the ordinates of a curve corresponding to the change in curvature of the timber and they may be fed to a computer programmed to recognise the possible patterns of curvature.

If there are oe or more regions of lower modulus of elasticity larger changes in curvature would occur in these regions than at other parts along the length of the piece and these changes would be detected by the sensors and recognised by the computer. If these changes exceed certain predetermined limits the computer decision might be to reject or down grade the piece.

The computer could also be arranged so as to cause the timber under test to be marked to show its grade and/or to control apparatus by which the timber is physically sorted into different grades.

The described machine is not suitable for handling timber of mixed lengths at high output since a substantial time is required to adjust the abutments 9 and 10 and the load applying means 11 and 12. However since the test deflection of the timber can be carried out very quickly the difficulty can be overcome by providing a machine having a load point at one end and a plurality of other load points distributed along the machine so as to provide for testing each length of timber the machine is required to handle. The appropriate other load point would be brought into operation automatically by means of a detector system which measures the length of the piece of timber coming into the machine for test.

In an alternative arrangement illustrated diagrammatically in FIG. 7 three separate testing stations 17, 18 and 19 are provided through which the timber is moved in succession, the direction of movement being always transverse to the length of the timber.

The timber moves in the direction shown by the arrows. A piece of timber 20 of any length within the capacity of the machine moves into the testing station 17 where a part of its length extending from the end 21 located by abutment 22 is tested. The piece than moves straight to the station 18. If as illustrated the piece is not long enough to engage both load points it passes by the station and proceeds to station 19. If it is long enough to engage both load points then that part of its length is tested. Finally in station 19 the end 23 of the piece is located by abutment 24 and that part of the piece extending from end 23 is tested. By a suitable location of the testing stations and spacing of the load points in each station a range of lengths of timber from say 2.40 m. to 6.30 m. can be dealt with.

The exact form of equipment of measuring the changes in curvature of the timber under load is not important so long as it is possible to obtain the required information as to the changes in the curve with the required accuracy. The equipment should however be robust and not easily damaged by the movement of timber into and out of the measuring apparatus. Other forms of sensors such as strain gauges could be used to measure change in curvature.

The method of this invention is an important over existing methods in that not only is it capable of measuring the modulus of elasticity at any point along a piece of timber but it also gives a corresponding measurement for the whole piece. The latter measurement is in practice equally important but in the known testing machine such information can only be deduced from a plurality of readings of the local modulus of elasticity.

The computer could be arranged to classify on any desired combination of the two criteria worst-local modulus of elasticity or gross modulus of elasticity.

Another great advantage of the method of this invention is that the timber is moved laterally into and out of the or each testing station. This enables the method to be readily applied in situations such as prevail in high output sawmills where timber is moved in this way in the factory and avoids the additional handling which would be necessary where the timber has to be turned round so as to be moved endwise through the known type of testing machine. Moreover, the total throughout obtainable with the method of this invention is many times greater that the maximum possible with the prior art machines.

I claim:
1. The method of testing timber which consists in the steps of firstly bending a length of timber by applying equal bending couples at two points spaced along the length, secondly equally altering said bending couples for changing the extent or direction of bending, and thirdly measuring along the whole length of timber between the said points the lateral change in deflection produced by said second step relative to the deflection produced by said first step for determining the change in curvature produced by said equal alteration of the bending couples.

2. The method claimed in claim 1, in which at each point the timber is supported on a fixed abutment and a load is applied to the timber adjacent to this point to produce the desired bending couple.

3. The method claimed in claim 1, in which at each point the timber is supported in a pivoted jaw which is then rotated through the angle required to apply the desired bending couple.

4. The method claimed in claim 1, in which the bending couples are applied at opposite ends of the length of timber under test whereby to effect a test of the whole piece in one position.

5. The method claimed in claim 1, in which bending couples are applied successively at spaced pairs of points along the length of timber, the span covered between the points of one pair overlapping the span covered between the points of another pair.

6. The method claimed in claim 5, in which each pair of points constitutes a separate testing station, the piece of timber being moved laterally between each station.

7. The method claimed in claim 1, in which the change in deflection is measured by a plurality of sensor arranged at equi-spaced points along the length of timber.

* * * * *